US012689646B2

(12) United States Patent
Jayaraman et al.

(10) Patent No.: US 12,689,646 B2
(45) Date of Patent: Jul. 21, 2026

(54) MALICIOUS APPLICATION DETECTION

(71) Applicant: Sophos Limited, Abingdon (GB)

(72) Inventors: Shankar Jayaraman, Bangalore (IN);
Rahul Pandey, Abingdon (GB);
Santosh Subramanya, Bangalore (IN);
Dhwanit Shah, Abingdon (GB); **Guy
Roberts**, Milton Keynes (GB)

(73) Assignee: Sophos Limited (GB)

( * ) Notice: Subject to any disclaimer, the term of this
patent is extended or adjusted under 35
U.S.C. 154(b) by 222 days.

(21) Appl. No.: 18/078,186

(22) Filed: Dec. 9, 2022

(65) Prior Publication Data

US 2024/0195830 A1 Jun. 13, 2024

(51) Int. Cl.
*H04L 9/40* (2022.01)
(52) U.S. Cl.
CPC ................................ *H04L 63/1433* (2013.01)
(58) Field of Classification Search
CPC ... H04L 63/145; H04L 63/1408; H04L 67/34;
H04L 67/04; H04L 9/3247; H04L 51/212;
G06F 21/53; G06F 21/56; G06F 21/564;
G06F 21/562; G06F 21/565; G06F
21/566; G06F 2221/033; G06F 9/455;
G06F 2009/45587; G06F 11/3409; G06F
2212/151
See application file for complete search history.

(56) References Cited

U.S. PATENT DOCUMENTS 8,893,278 B1 * 11/2014 Chechik .................. G06F 21/56
713/188
8,914,629 B2 * 12/2014 Rubin ................. H04L 63/0823
713/157
8,966,632 B1 * 2/2015 Huang .................. G06F 21/566
726/21
9,124,472 B1 * 9/2015 Schneider ............. H04L 69/329
(Continued)

OTHER PUBLICATIONS

Ã. Aslan and R. Samet, "Investigation of Possibilities to Detect
Malware Using Existing Tools," 2017 IEEE/ACS 14th International
Conference on Computer Systems and Applications (AICCSA),
Hammamet, Tunisia, 2017, pp. 1277-1284, doi: 10.1109/AICCSA.
2017.24. (Year: 2017).*

(Continued)

*Primary Examiner* — Michael Simitoski
(74) *Attorney, Agent, or Firm* — Danielson Legal LLC

(57) ABSTRACT

Systems and methods for methods network activity. The
methods include receiving at an interface connection data
associated with a request from a first device to download an
application from a source, downloading the application to a
second device based on the request, and executing, using
one or more processors executing instructions stored on
memory, the downloaded application to obtain behavioral
data of the application. The methods further include assign-
ing, using the one or more processors, a risk score to the
application based on the behavioral data of the application to
determine whether the application is malicious before the
application is downloaded by the first device, and imple- (Continued)

RECEIVING CONNECTION DATA ASSOCIATED WITH A REQUEST
FROM A FIRST DEVICE TO DOWNLOAD AN APPLICATION FROM A
SOURCE — 502

DOWNLOADING THE APPLICATION TO A SECOND DEVICE
BASED ON THE REQUEST — 504

EXECUTING A HASH ALGORITHM TO GENERATE A HASH OF
A PACKAGE FILE ASSOCIATED WITH THE APPLICATION — 506

COMPARING THE GENERATED HASH TO AT LEAST ONE
STORED HASH — 508

DETERMINING WHETHER THE GENERATED HASH MATCHES
THE AT LEAST ONE STORED HASH — 510

EXECUTING THE DOWNLOADED APPLICATION TO OBTAIN
BEHAVIORAL DATA OF THE APPLICATION — 512

ASSIGNING A RISK CORE TO THE APPLICATION BASED ON THE
BEHAVIORAL DATA OF THE APPLICATION — 514

IMPLEMENTING A DOWNLOAD DECISION FOR THE FIRST DEVICE
BASED ON THE ASSIGNED RISK SCORE — 516

500 menting, using the one or more processors, a download decision for the first device based on the assigned risk score, wherein the download decision indicates at least whether the first device is able to download the application associated with the request.

20 Claims, 5 Drawing Sheets

(56) References Cited

U.S. PATENT DOCUMENTS

| | | | | |
|---|---|---|---|---|
| 9,215,239 | B1* | 12/2015 | Wang | G06F 21/566 |
| 11,356,853 | B1* | 6/2022 | Wu | G06F 21/564 |
| 11,757,975 | B1* | 9/2023 | Pandey | G06F 21/565 |
| | | | | 709/219 |
| 11,863,586 | B1* | 1/2024 | Duan | H04L 63/0263 |
| 2006/0064582 | A1* | 3/2006 | Teal | G06F 21/105 |
| | | | | 713/156 |
| 2006/0200849 | A1* | 9/2006 | Sundarrajan | H04L 69/163 |
| | | | | 725/110 |
| 2006/0242406 | A1* | 10/2006 | Barde | H04L 9/3247 |
| | | | | 713/164 |
| 2011/0047620 | A1* | 2/2011 | Mahaffey | G06F 21/56 |
| | | | | 726/22 |
| 2011/0185428 | A1* | 7/2011 | Sallam | G06F 21/566 |
| | | | | 707/769 |
| 2012/0304244 | A1* | 11/2012 | Xie | H04L 63/1425 |
| | | | | 726/1 |
| 2013/0198512 | A1* | 8/2013 | Rubin | H04L 63/0823 |
| | | | | 713/157 |
| 2013/0347094 | A1* | 12/2013 | Bettini | H04L 63/1433 |
| | | | | 726/11 |
| 2014/0013434 | A1* | 1/2014 | Ranum | G06F 21/564 |
| | | | | 726/24 |
| 2016/0099963 | A1* | 4/2016 | Mahaffey | H04L 63/166 |
| | | | | 726/25 |
| 2016/0112444 | A1* | 4/2016 | Palumbo | G06F 21/567 |
| | | | | 726/23 |
| 2016/0173488 | A1* | 6/2016 | Xie | H04L 9/3263 |
| | | | | 713/156 |
| 2016/0197890 | A1* | 7/2016 | Martini | H04L 63/04 |
| | | | | 713/168 |
| 2016/0217282 | A1* | 7/2016 | Vecera | G06F 21/50 |
| 2016/0269433 | A1* | 9/2016 | Jiang | H04L 67/34 |
| 2016/0321452 | A1* | 11/2016 | Richardson | H04W 12/12 |
| 2016/0366100 | A1* | 12/2016 | Liu | G06F 21/552 |
| 2017/0163736 | A1* | 6/2017 | Jiang | H04L 63/306 |
| 2017/0187682 | A1* | 6/2017 | Perlmutter | H04L 67/06 |
| 2017/0289104 | A1* | 10/2017 | Shankar | H04L 63/166 |
| 2017/0325113 | A1* | 11/2017 | Markopoulou | H04L 43/065 |
| 2019/0026465 | A1* | 1/2019 | Ardeli | H04L 63/0236 |
| 2019/0238565 | A1* | 8/2019 | Wang | G06F 21/566 |
| 2019/0354709 | A1* | 11/2019 | Brinskelle | G06F 21/31 |
| 2020/0210579 | A1* | 7/2020 | Chen | G06F 8/60 |
| 2020/0236104 | A1* | 7/2020 | Konda | H04L 9/0844 |
| 2020/0252803 | A1* | 8/2020 | Shah | G06N 20/20 |
| 2020/0311259 | A1* | 10/2020 | Schmugar | G06F 21/554 |
| 2021/0019412 | A1* | 1/2021 | Hewlett, II | G06F 21/565 |
| 2021/0136037 | A1* | 5/2021 | Balasubramaniam | |
| | | | | H04L 61/4511 |
| 2021/0194900 | A1* | 6/2021 | Schmidtler | H04L 63/1416 |
| 2021/0264030 | A1* | 8/2021 | Xu | G06F 21/562 |
| 2022/0103594 | A1* | 3/2022 | Galloway | H04L 63/205 |
| 2022/0239678 | A1* | 7/2022 | Rehak | H04L 63/20 |
| 2023/0229771 | A1* | 7/2023 | Gambhir Parekh | G06F 21/566 |
| | | | | 726/24 |
| 2023/0388578 | A1* | 11/2023 | Brockmann | H04N 21/47217 |
| 2023/0396649 | A1* | 12/2023 | Mathur | H04L 63/1483 |

OTHER PUBLICATIONS

H. Qian and Q. Wen, "A cloud-based system for enhancing security of Android devices," 2012 IEEE 2nd International Conference on Cloud Computing and Intelligence Systems, Hangzhou, China, 2012, pp. 245-249, doi: 10.1109/CCIS.2012.6664405. (Year: 2012).*

* cited by examiner

APPLICATION DATA

RISK SCORE MODULE 132

STATIC 214

URL REPUTATION 302

DOMAIN REPUTATION 304

FILE TYPE 306

DYNAMIC 216

NETWORK ACCESS 308

FUNCTION CALL 310

RISK SCORE

220

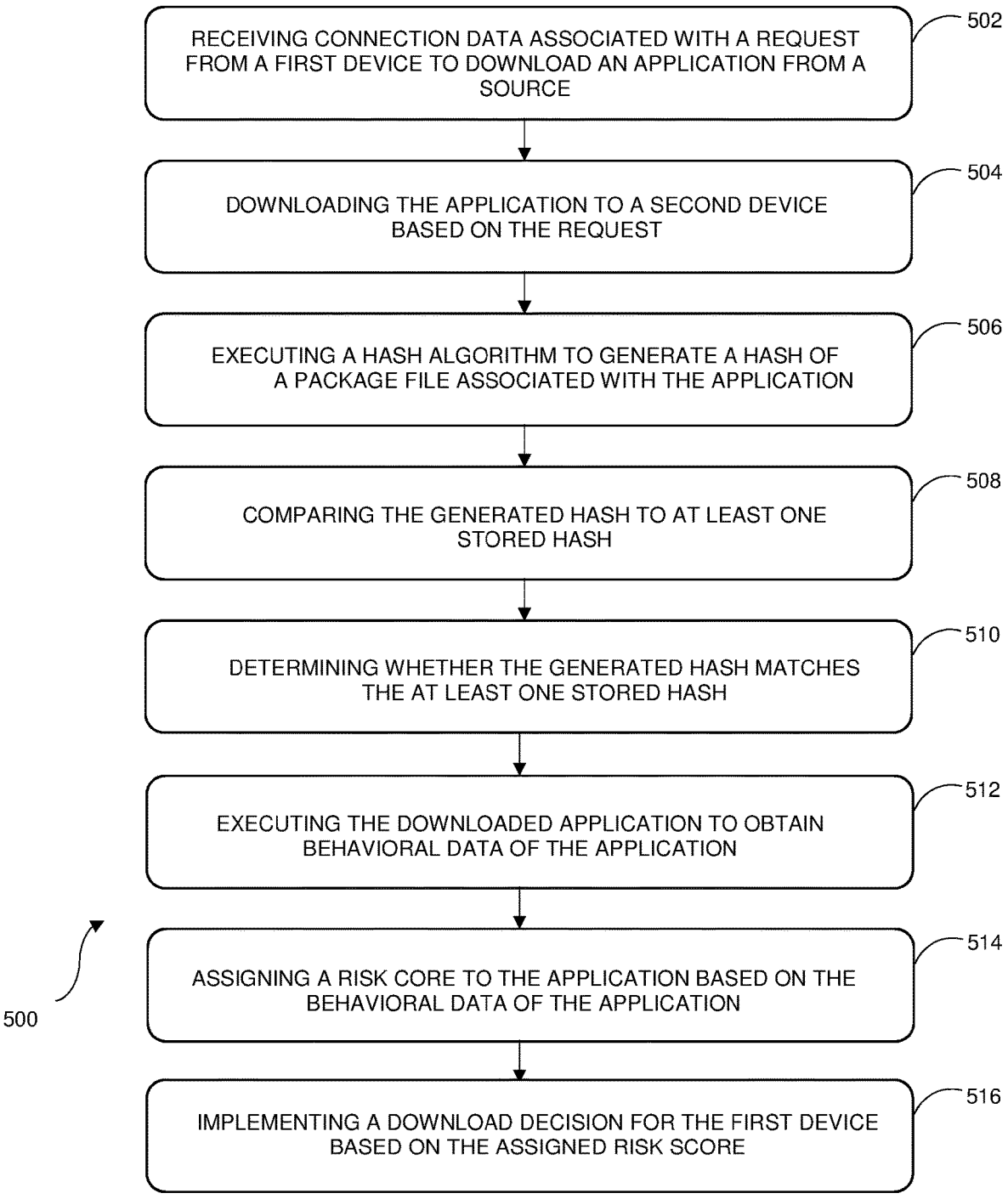

RECEIVING CONNECTION DATA ASSOCIATED WITH A REQUEST FROM A FIRST DEVICE TO DOWNLOAD AN APPLICATION FROM A SOURCE ⟋502

DOWNLOADING THE APPLICATION TO A SECOND DEVICE BASED ON THE REQUEST ⟋504

EXECUTING A HASH ALGORITHM TO GENERATE A HASH OF A PACKAGE FILE ASSOCIATED WITH THE APPLICATION ⟋506

COMPARING THE GENERATED HASH TO AT LEAST ONE STORED HASH ⟋508

DETERMINING WHETHER THE GENERATED HASH MATCHES THE AT LEAST ONE STORED HASH ⟋510

EXECUTING THE DOWNLOADED APPLICATION TO OBTAIN BEHAVIORAL DATA OF THE APPLICATION ⟋512

ASSIGNING A RISK CORE TO THE APPLICATION BASED ON THE BEHAVIORAL DATA OF THE APPLICATION ⟋514

500

IMPLEMENTING A DOWNLOAD DECISION FOR THE FIRST DEVICE BASED ON THE ASSIGNED RISK SCORE ⟋516

FIG. 5

MALICIOUS APPLICATION DETECTION

CROSS-REFERENCE TO RELATED APPLICATIONS

The present application is related to U.S. patent application Ser. No. 18/078,336, filed Dec. 9, 2022, the content of which is hereby incorporated by reference as if set forth in its entirety herein.

TECHNICAL FIELD

The present application relates generally to systems and methods for detecting malicious network activity and, more particularly but not exclusively, to systems and methods for protecting network devices from malicious applications.

BACKGROUND

Operators of user devices such as smartphones may download applications for a variety of purposes. Users may use their device to download applications such as games, email services, browsers, tools or services, social media platforms, or the like.

Although these applications are sometimes subject to a variety of security reviews, especially when they are delivered through trusted sources like application stores, it is a matter of public record that even trusted sources have served as vectors for the delivery of applications that have included malware, spyware, or other undesirable functionality.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

Embodiments herein provide systems and methods for monitoring network activity. Specifically, the systems and methods herein may interrupt and prevent the installation of an application on a first device to evaluate the application before completing the installation of the application.

The systems described herein may first receive connection data regarding a request from a first device to download an application from a source. An agent executing on the first device may intercept connection data related to the request. For example, the agent may intercept HyperText Transfer Protocol (HTTP) traffic between the source and the first device.

A second device such as a server may identify the desired application and the source based on the intercepted connection data and download the application. The second device to which the application is downloaded is separate from the first device.

The second device may then execute the downloaded application in a secure environment to obtain behavioral data of the application. The secure environment may be a sandbox environment, for example. The embodiments herein may calculate and assign a risk score to the application based on the obtained behavioral data.

The embodiments herein may then implement a download decision based on the assigned risk score. The download decision may indicate at least whether a first device is able to download the application associated with the request.

BRIEF DESCRIPTION OF DRAWINGS

Non-limiting and non-exhaustive embodiments of the invention are described with reference to the following figures, wherein like reference numerals refer to like parts throughout the various views unless otherwise specified.

FIG. 5 depicts a flowchart of a method for monitoring network activity in accordance with one embodiment.

DETAILED DESCRIPTION

Figure 1:
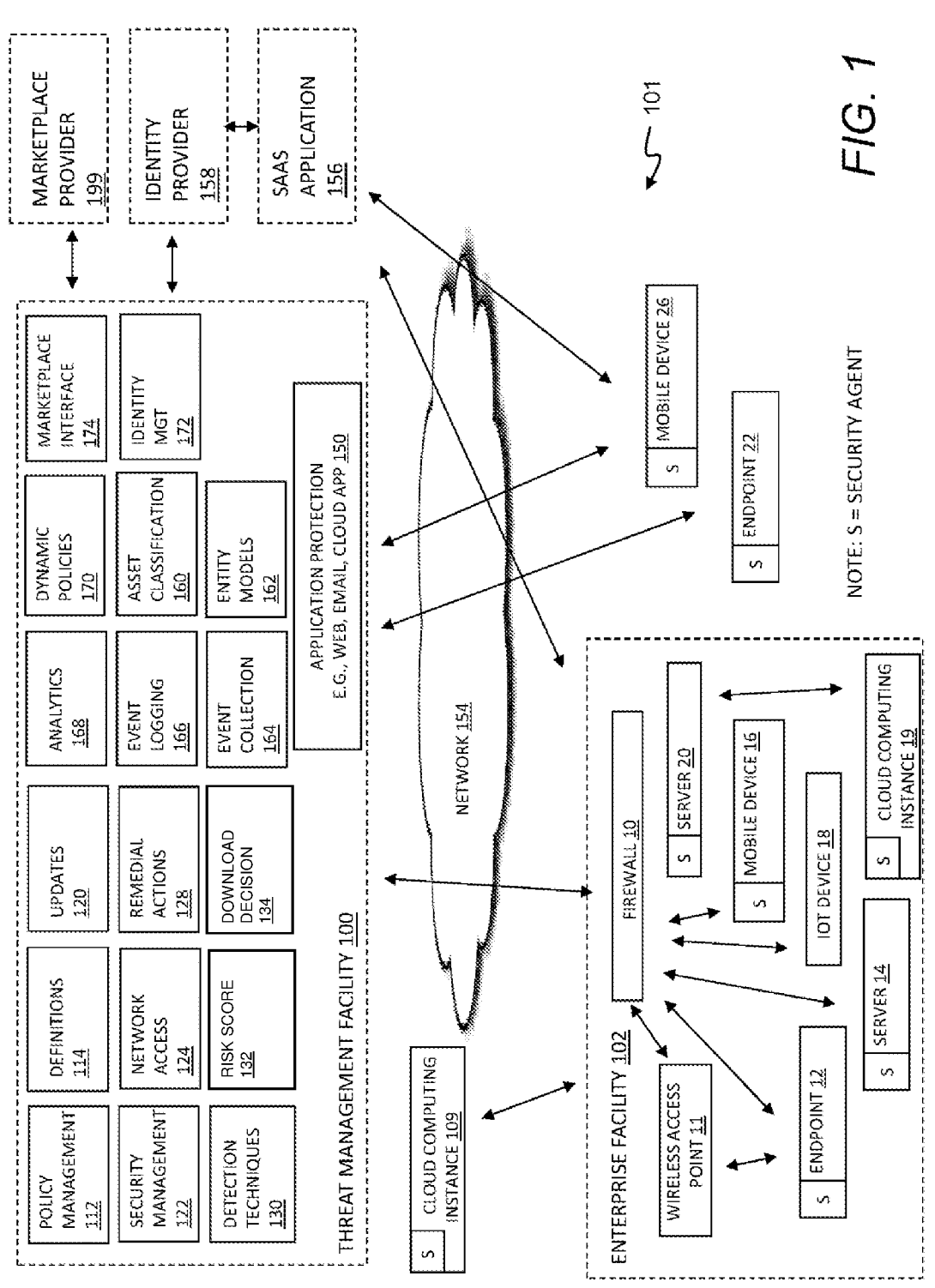
FIG. 1 illustrates a threat management system in accordance with one embodiment.

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

In some instances, an evaluation of an application can only be performed after it is downloaded and installed onto a user device. However, the application may immediately start exfiltrating data or performing other malicious actions as soon as it is installed on a device.

Accordingly, the embodiments described herein overcome these disadvantages by evaluating an application at location separate from the user device and before the user device installs the application.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

The threat management facility 100 may execute one or more modules or facilities to analyze applications that have been requested for download by a user device. For example, the threat management facility 100 may be tasked with monitoring and ensuring the security of devices on an enterprise facility 102. Upon a device on the enterprise facility 102 requesting to download an application, the threat management facility 100 or components thereof may analyze the application to determine whether the device is permitted to download the application.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint 12, a server 14, a mobile device 16, an appliance or Internet-of-Things (IOT) device 18, a cloud computing instance 19, and a server 20. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, risk score module 132, download decision module 134, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 may inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data is made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that may be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, macOS, OS X, Linux, Android, IOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so they may be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102 as identified by one or more of the facilities such as the policy management facility 112, security management facility 122, update facility 120, definitions facility 114, network access facility 124, detection techniques facility 130, a risk score module 132, a decision module 134, application protection 150, asset classification facility 160, entity model facility 162, event collection facility 164, event logging facility 166, analytics facility 168, dynamic policies facility 170, identity management facility 172, as well as other facilities. For example, the risk score module 132 may, as discussed below with reference to FIGS. 2-5, assign a risk score to an application requested for download by a device on the enterprise facility 102. The download decision module 134 may then implement a download decision that indicates at least whether the device is able to download the application associated with the request.

As discussed previously, users of user devices such as smartphones may download applications to their device from application stores or from third-party websites, including those operated by the application provider. The latter is referred to as side-loading. Side-loading can be risky to the downloader because applications downloaded from websites may not be subject to security controls or vetting procedures. These vetting procedures are more common with application stores, but even application stores have been known to deliver malware in their application downloads.

Typically, operating systems executing on user devices detect whether an application is harmful only after the application is installed on a user device. At this point, however, a malicious application may have already performed some harmful actions in furtherance of a malicious campaign. For example, a malicious application may attempt to contact a command-and-control server and begin exfiltrating data from the user device upon installation.

Figure 2:
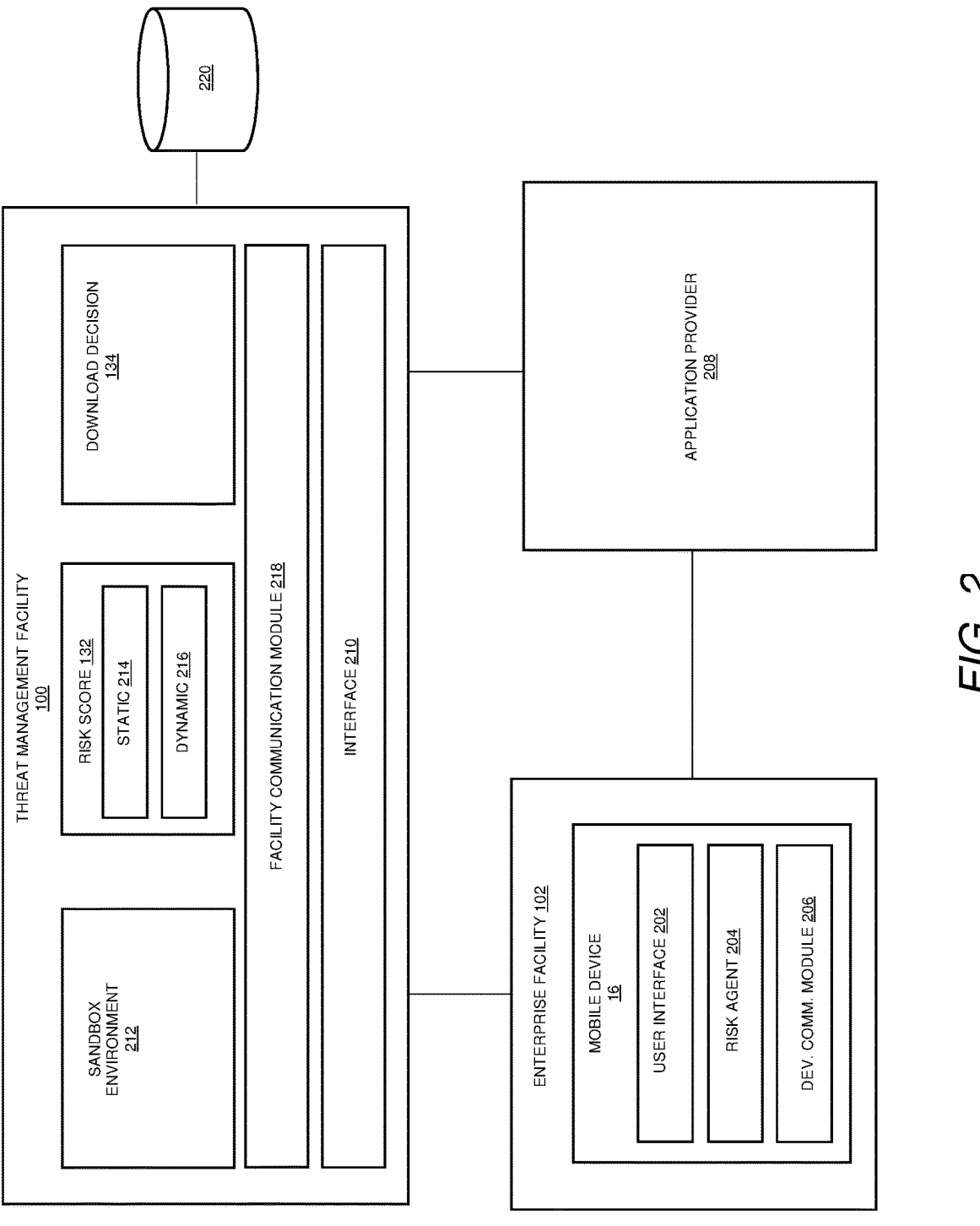
FIG. 2 illustrates a portion of the threat management system of FIG. 1 in accordance with one embodiment.

The embodiments described herein may determine whether an application is associated with malicious activity before it is installed on a user device. FIG. 2 illustrates a portion of the threat management facility 100 of FIG. 1 in communication with a mobile device 16 of the enterprise facility 102. The mobile device 16 may include a user interface 202, a risk agent 204, and a device communication module 206. The device communication module 206 may be configured to report certain data back to the threat management facility 100. FIG. 2 also illustrates an application provider 208, the threat management facility 100 with an interface 210, a sandbox environment 212, the risk score module 132, and the download decision module 134. The risk score module 132 may include a static analysis module 214 and a dynamic analysis module 216. The threat management facility 100 may also include a facility communication module 218, and may also be in communication with one or more databases 220.

The interface 210 may be implemented as a port or socket able to receive communications sent from the server enterprise facility 102 or the application provider 208. In some embodiments, the interface 210 may be implemented as a hardware interface such as a fiber optic interface, Universal Serial Bus (USB) interface, Ethernet interface, or any other type of interface whether available now or invented hereafter.

The sandbox environment 212 may be implemented by one or more virtual machines executed by any appropriate virtualization technology. These virtual machines may execute on physical infrastructure comprising Type 1 or Type 2 hypervisors. Additionally and/or alternatively, the sandbox environment 212 may be implemented as a container-based architecture, such as Kubernetes, Docker, or the like.

The risk module 132 or analysis modules thereof may be implemented using one or more computer-programming and/or scripting languages. These may include, but are not limited to, C, C++, Java, Python, Perl, Javascript, or the like.

Similarly, the download decision module 134 may be implemented using one or more computer-programming and/or scripting languages. These may include, but are not limited to, C, C++, Java, Python, Perl, JavaScript, or the like.

The mobile device 16 may be, for example, a company-issued smartphone provided to a user such as an employee. Although the present application is largely discussed in the context of smartphones, the user device(s) discussed herein may include other types of devices capable of installing applications such as tablets, smartwatches, laptops, smart appliances, etc.

In operation, the user of the mobile device 16 may wish to download an application from an application provider 208. As discussed previously, there may be risks associated with the downloaded application, particularly from the application provider.

The agent 204 may be installed on the user device 16 with a root certificate and associated root privileges. Upon or after the mobile device 16 requests to download the application from the application provider 208, the agent 204 may intercept any HyperText Transfer Protocol (HTTP) or HyperText Transfer Protocol Secure (HTTPS) traffic associated with the communications between the mobile device 16 and the application provider 208. The agent 16 may act a proxy and decrypt the HTTPS traffic. In other words, because the agent 204 is configured with root privileges, the agent 204 may have visibility into traffic sent to and from the mobile device 16.

This traffic may include, for example, an archive or package file such as an Android Package Kit or Android Application Package (for simplicity, "APK"). An APK may include a file format that users of Android® devices use to install applications. When a user opens an APK on their device, the APK executes instructions regarding how the application is to be installed on the device.

The agent 204 may extract various data regarding the traffic associated with the request. For example, the agent

204 may extract the package name, the location of the user, a domain name associated with the provider, or the like.

Since the agent 204 has visibility into the HTTP/HTTPS traffic, the agent 204 may note the APK file of the GET request submitted by the mobile device 16. For example, the agent 204 may extract a file name from a Uniform Resource Identifier (URI), as APK files have an .apk extension in a URI. Further confirmation that a file is an APK file can be performed by checking for strings such as "META-INF/MANIFEST.MF" in the HTTP response payload. From this data, the agent 204 can extract the internet protocol (IP) address, domain name from host header, uniform resource locator (URL) from referrer header, or the like.

The HTTP response packet for the GET request for the APK file may be held in memory associated with the mobile device 16 until a result from the threat management facility 100 is received. The download connection between the mobile device 16 and the application provider 208 is kept on hold by sending HTTP keep alive messages from the device 16 to the application provider 208. Meanwhile, the device communication module 206 may submit connection data extracted from the APK file to the facility communication module 218. Using connection details such as the file name, URL in the referrer header, the threat management facility 100 may then send a request to the application provider 208 to download the requested application.

The threat management facility 100 may then download the same application using the provided connection data. That is, since the threat management facility 100 now has the APK file name, the domain from where the application can be downloaded, etc., the threat management facility 100 can download the application directly from the application provider 208.

In some embodiments, the mobile device 16 may attempt to download an application from a reputable source such as the Google Play Store (not shown in FIG. 2) by issuing a GET request. Since the agent 204 has complete visibility to HTTP/HTTPS traffic, the agent 204 may identify the package name as a value for the key ID attribute in the GET request. For example, in "play.google.com/store/apps/details?id=com.instagram.android" the package name is "com.instagram.android."

The agent 204 may obtain the ID value and the IP address from the GET request. As in the sideloading process discussed above, the mobile device 16 may send keep alive messages to Google Play Store to keep the connection on hold. Meanwhile, the device communication module 206 may submit the extracted connection data to the interface 210, where it is then received by the facility communication module 218.

The threat management facility 100 may then download the requested application (as identified by the extracted ID value) from the Google Play Store of the region associated with the user of the mobile device 16. For example, the IP address associated with the mobile device 16 may indicate the geographical region of the device 16. Accordingly, the threat management facility 100 may download the exact application requested by the mobile device 16 by accessing the Google Play Store associated with the user's region.

The components of the threat management facility 100 in accordance with the embodiments herein may be located on premise with the enterprise facility 102 or at a location remote from the enterprise facility, such as with a cloud-based or a software-as-a-service (SAAS) provider. For on-premise deployments, the entity associated with the enterprise facility 102 may host the components of the threat management facility 102.

The threat management facility 100 may execute a Secure Hash Algorithm (SHA) such as hash functions associated with the SHA-2 or SHA-3 hash function families to calculate a hash pertaining to the downloaded APK. The threat management facility 100 may then reference a database 220 storing hashes or known files. If there is a match between the calculated hash and a hash stored in the database 220, the threat management facility 100 may conclude that the requested file or application is known or has previously been reviewed. For example, the calculated hash may match a stored hash that is associated with a known, legitimate application.

If there is no match between a generated hash and one stored in the database 220, that may suggest that the threat management facility 100 is unfamiliar with the application. Accordingly, the threat management facility 100 may analyze the downloaded application to obtain behavioral data associated with the application.

Figure 3:
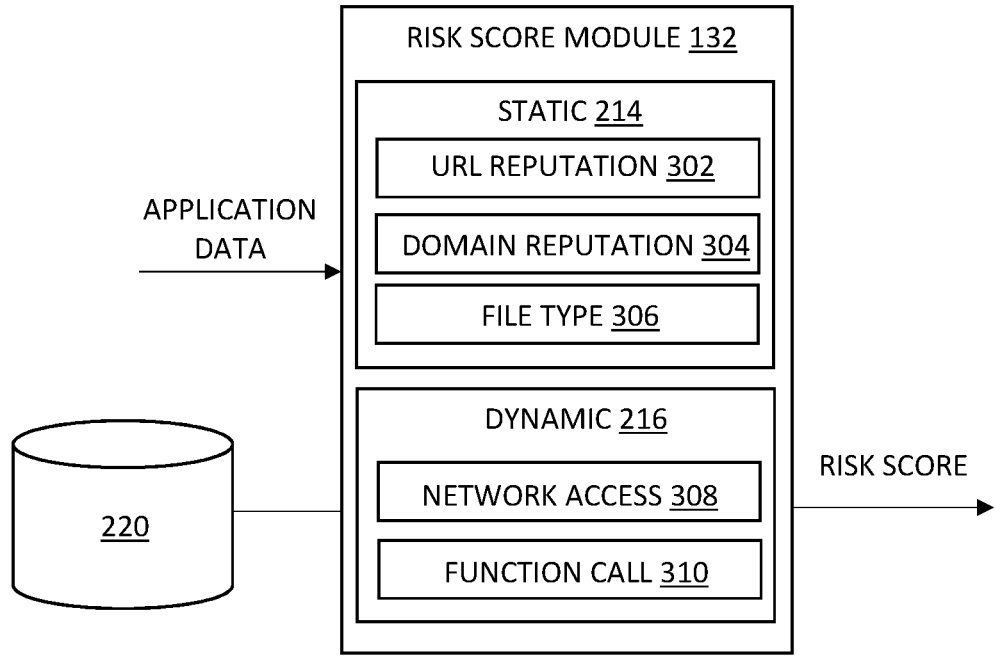
FIG. 3 illustrates the risk score module of FIG. 2 in accordance with one embodiment.

FIG. 3 illustrates the risk score module 132 of FIGS. 1 and 2 in more detail in accordance with one embodiment. As seen in FIG. 3, the risk score module 132 may execute a static analysis module 214, a dynamic analysis module 216, or both. The static analysis module 214 may obtain or otherwise analyze static data about the application and the dynamic analysis module 216 may obtain or otherwise analyze dynamic data about the application.

The static analysis module 214 may consider data such as, for example and without limitation, function calls, the general format and appearance of assembly code, metadata associated with the application, or the like. The static analysis module 214 may receive this data from the APK file of the application, for example. Applications may be built using high-level programming languages such as, but not limited to, C, C++, Java, Python, Perl, JavaScript, or the like. This language will be converted to a low-level assembly language, referred to as assembly code. The static analysis module 214 may perform its analysis on this assembly code.

In some embodiments, a uniform resource locator (URL) reputation submodule 302 may analyze the reputation of a URL associated with the application. The URL reputation submodule 302 may reference a data structure in the database 220 such as a table or list of known, malicious URLs. The URL reputation submodule 302 may compare a URL associated with the application to determine if it matches a known, malicious URL stored in one or more databases 220, or is at least similar enough to a known malicious URL to warrant suspicion.

A domain reputation submodule 304 may analyze the reputation of a domain associated with the application. For example, the databases 220 may include a data structure such as a table or a list storing known, malicious domains. The domain reputation submodule 304 may compare a domain associated with an application with the lists or tables of known, malicious domains to determine whether the domain associated with the application matches or is at least similar enough to a known, malicious domain to warrant suspicion.

A file type(s) submodule 306 may consider the type of file(s) associated with the application. The file type submodule 306 may reference a data structure in the database 220 such as a table or a list of file types commonly associated with malware. Malware may execute through file types such as executable files (".exe"), Rich Text Format ("RTF") files, and Virtual Basic Script ("VBS") files. Accordingly, the file type submodule 306 may compare the type of file(s) of the application with types commonly associated with malware. If an analyzed file is of the same type as file types commonly associated with malware, it may suggest the application could be used for a malicious purpose or is at least suspicious.

The dynamic analysis module 216 may analyze the application's execution in the sandbox environment 212. For example, the dynamic data may include a network access sub-module 308 to determine whether one or more of executed applications has network access, a function call submodule 310 to detect and analyze any function calls, or the like. Other types of dynamic data, whether available now or invented hereafter, and in addition to or in lieu of the data above may be considered to accomplish the objectives of the embodiments herein.

The risk score module 132 may then calculate a risk score for the application based on the data associated with the application. The risk score may represent whether the application is malicious, the probability of the application being malicious, the degree to which the application is malicious, or the like.

For example, each submodule 302-10 may output a "vote" of whether its associated property indicates or likely indicates the application is malicious. The score may be based on a cumulative number of votes, for example. Additionally, or alternatively, each of the behavioral properties may be weighted. For example, if a particular property is heavily weighted, the risk score module 132 may calculate a higher score even if the heavily weighted behavioral property is the only one that suggests the application is malicious.

Accordingly, in some embodiments the risk score may be a weighted average, and the risk score module 132 may calculate the weighted average W by:

$$W = \frac{\sum_{i=1}^{n} \omega_i X_i}{\sum_{i=1}^{n} \omega_i}$$

where: W is the calculated weighted average (i.e., the overall score):
    n is the number of individual property scores to be averaged,
    $\omega_i$ are the weights applied to each property score, and
    $X_i$ is the data values to be averaged.

The weights assigned to each of the above-discussed properties may vary and may depend on the application, the environment, the security vendor's preferences, or some combination thereof. For example, a security vendor may place higher weights on properties such as URL reputation and file reputation, as these properties may tend to accurately classify an application as malicious. That is, if the URL associated with an application under analysis matches a URL that is known to be malicious, there is a high likelihood that the analyzed application is malicious.

On the other hand, a security vendor may assign a lower weight (e.g., less than 1.0) to properties that may not be as accurate in predicting whether an application is associated with malicious activity. For example, executable files are commonly used in operating systems, and their presence may not necessarily be indicative of malicious activity.

Referring back to FIG. 2, the download decision module 134 may then implement a download decision based on the calculated risk score. For example, the download decision module 134 may prevent the mobile device 16 from downloading the application. Alternatively, the download decision module 134 may communicate the risk score to the mobile device 16. The user interface 202 of the mobile device 16 may present to the user the risk score in an easy-to-understand format. The user may then decide for themselves whether or not to proceed with downloading and installing the application.

Figure 4:
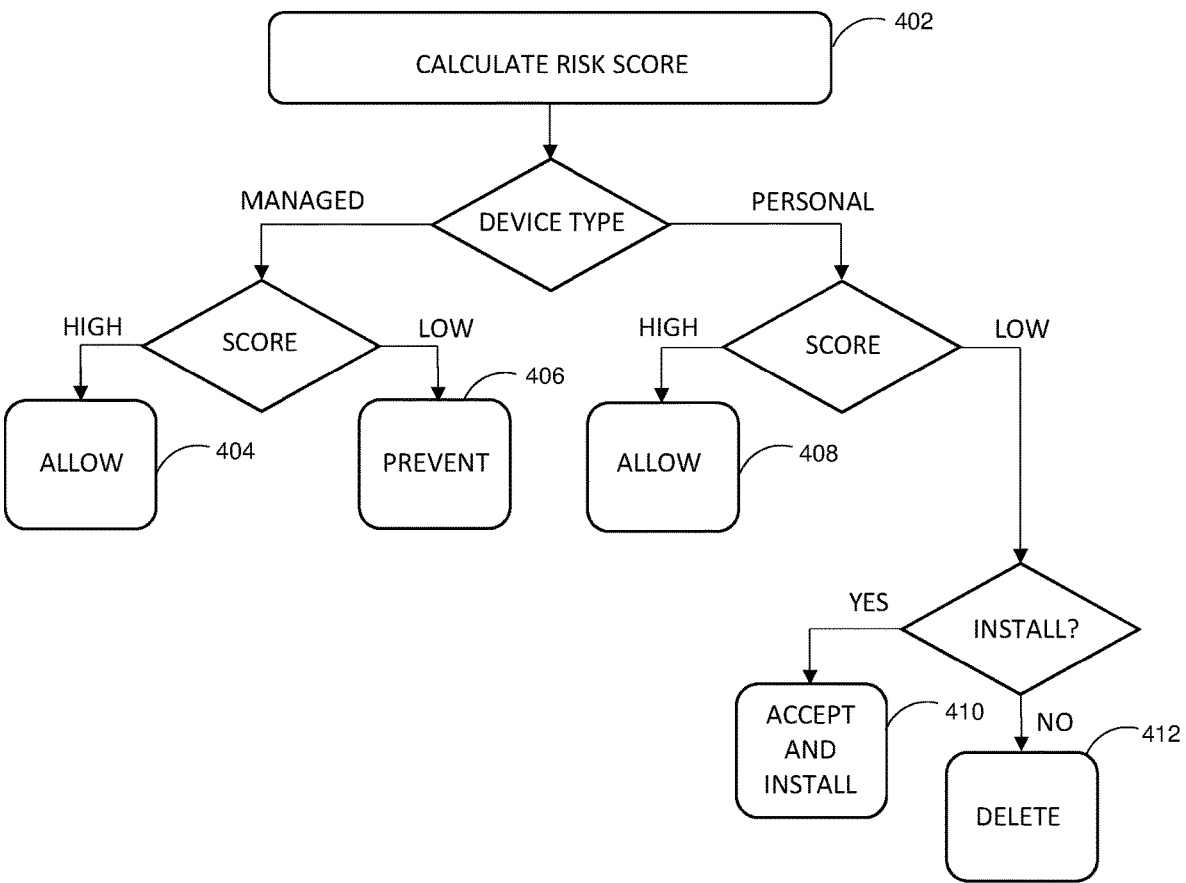
FIG. 4 depicts a flowchart of a method for implementing a download decision in accordance with one embodiment.

The download decision implemented by the decision module 134 may vary and may depend on the type of device requesting the download. FIG. 4 depicts a flowchart of a method 400 of implementing a download decision in accordance with one embodiment.

Step 402 involves calculating the risk score as discussed previously. The type of download decision implemented by the download decision module 134 may depend on the type of device. For example, the device may be managed by company security personnel, or it may be a personal device. Generally, managed devices may be subject to more heightened security precautions than personal devices.

Accordingly, if a calculated score for an application requested by a managed device is high, it may in some embodiments indicate there is a low risk associated with the application. In this scenario, method 400 may proceed to step 404, which involves allowing the managed device to install the application.

In another scenario, the calculated score for an application requested by a managed device may be low. This may indicate there is a high risk associated with the application. In this scenario, method 400 may proceed to step 406. Step 406 involves preventing the managed device from installing the application. In this scenario, the user of the managed device may be presented with a message informing them that the application is not allowed to be installed due to the calculated risk score.

A score may be considered "low" if it is below some threshold value. For example, a risk score can be in the range of zero "0" to one hundred "100," and a score of below fifty "50" may be considered a low score. A score below 50 in this case may indicate there is a greater chance of the application being malicious than being non-malicious, for example. Similarly, an application with a score of ten may be more likely to be malicious than an application with a score of twenty. A risk score equal to or above 50 may be considered a "high" score. A score equal to or above 50 may indicate there is a great chance of the application being non-malicious than being malicious. This discussion of scores, ranges, and interpretations is presented by way of example only, and other methodologies of calculating and interpreting risk scores may be used in accordance with the embodiments herein.

In other scenarios, the method 400 may involve a personal device. If a calculated score for an application requested by a personal device is high, it may in some embodiments indicate there is a low risk as associated with the application. In this scenario, method 400 may proceed to step 408, which involves allowing the personal device to install the application.

In another scenario, a calculated score for an application requested by a personal device may be low. This may indicate there is a high risk associated with the application. As personal devices may not be subject to the same security requirements as managed devices, a user of the personal device may still be able to install the application. The user may be presented with a prompt to confirm they would like to continue with the installation notwithstanding the risk. For example, the prompt may present the score to the user along with a message asking if the user still wants to install the application. If yes, method 400 may proceed to step 410 which involves the user accepting the risk and installing the application. Alternatively, the user may decide to not install the application. In this case method 400 may proceed to step 412 which involves deleting the application.

FIG. 5 depicts a flowchart of a method 500 for monitoring network activity in accordance with one embodiment. The threat management facility 100 of FIG. 1 or components thereof may perform the steps of method 500.

Step 502 involves receiving at an interface connection data associated with a request from a first device to download an application from a source. As discussed previously, this may be a request from a user device 16 to download an application from an application provider 208.

The first device 16 may include an agent 204 configured to intercept communications from the source, which may be the application provider 208. The agent 204 may communicate the intercepted communication data to the interface 210. In this embodiment, the interface may be configured as part of the threat management facility 102 as in FIG. 2.

Step 504 involves downloading the application to a second device based on the request. The second device may refer to the threat management facility 100 of FIG. 1 or a server associated therewith. The connection data may include various types of data associated with the source 208. The connection data may include an IP address associated with the source 208, a file name of the application, a domain name associated with the application, or the like. Accordingly, the second device 100 may leverage the received connection data to identify the application and the location from which it can be downloaded.

Step 506 involves executing a hash algorithm to generate a hash of a data package file associated with the application. The data may be a tuple including, for example, a source IP address, a destination IP address, a source port associated with a connection, a destination port associated with a connection, or the like.

Step 508 involves comparing the generated hash to at least one stored hash. The embodiments herein may include one or more databases 220 of stored hashes associated with known applications.

Step 510 involves determining whether the generated hash matches at least one stored hash. If the generated hash matches a stored hash, the embodiments herein may conclude that the application is a known application. If the matched, stored hash is associated with an application known to be legitimate, there may be little cause for concern regarding the application. In this scenario, the application may be downloaded to the user's device.

Alternatively, the hash may not match any of the stored hashes. In this scenario, method 500 may proceed to step 512. Once the application is downloaded, step 512 involves executing, using one or more processors executing instructions stored on memory, the downloaded application to obtain behavioral data of the application. Step 512 may involve executing the application in a sandbox environment 212, for example.

The obtained behavioral data may relate to features or properties associated with the application. These may include static features, such as the type(s) of files associated with the application, a reputation of a domain associated with the application, characteristics of assembly code associated with the application such as whether the code follows standard or otherwise accepted practices of code writing, metadata associated with the application, or the like.

The behavioral data may include dynamic features, such as function calls, whether the application has network access, whether the application makes network access attempts, whether the application attempts to exfiltrate data, or the like. The behavioral data may include some combination of static features and dynamic features.

Step 514 involves assigning, using the one or more processors, a risk score to the application based on the behavioral data of the application to determine whether the application is malicious before the application is downloaded by the first device 16. Method 500 therefore detects whether and to what extent an application is malicious before it can be installed by the first device 16. The risk score may be calculated in any one or more of a variety of ways such as those discussed previously.

Step 516 involves implementing, using the one or more processors, a download decision for the first device 16 based on the assigned risk score. The download decision indicates at least whether the first device 16 is able to download the application associated with the request. The implemented download decision may be based on the risk score exceeding a threshold score. Step 516 may involve the process discussed above in conjunction with FIG. 4.

In some embodiments, such as in scenarios in which the user device 16 is a personal device, step 516 may involve presenting the risk score to the first device 16 and requesting confirmation from a user of the first device 16 to download the application. If the user wants to proceed with the download, step 516 may further involve receiving an input from a user of the first device 16 providing confirmation to download the application. The first device 16 may then download the application upon receiving confirmation to download the application.

An administrator associated with an enterprise facility 102 or a threat management facility 100 may define a threshold risk score value to distinguish between acceptable risk scores and prohibitive risk scores. For example, an administrator may define a threshold score such that, calculated risk scores above the threshold score are considered safe and calculated risk scores below the threshold score are considered prohibitively dangerous or otherwise malicious. Alternatively, the threshold score may be defined such that scores below the threshold score are considered safe, and calculated scores above the threshold score are considered prohibitively dangerous or otherwise malicious.

As discussed above, in some instances it is possible to detect whether an application is malicious only after it has been downloaded and installed onto a device. By this time, the application may have already started performing malicious activity in furtherance of a malware campaign. For example, the application may immediately attempt to contact a command-and-control server or begin exfiltrating data.

The embodiments herein provide novel advantages in the technical field of malicious activity detection. The embodiments herein ensure that a user device, and potentially and its associated network or other devices thereon, are not at risk from malicious activity resultant from a harmful application being downloaded. Specifically, the embodiments herein perform an analysis of a requested application at a secure environment separate from the user device before the application can be installed by the user device.

If the aforementioned analysis of the application in the secure environment suggests the application is malicious or is at least likely malicious, the embodiments herein may prevent the application from being installed on the user device. This ensures the device can continue to function as intended and without being impacted by malicious activity. The embodiments herein therefore, among other benefits, preserve computing resources as resources are not required to, for example, remediate the effects of malicious activity.

In one aspect, embodiments relate to a method for monitoring network activity. The method includes receiving at an interface connection data associated with a request from a first device to download an application from a source; downloading the application to a second device based on the request; executing, using one or more processors executing instructions stored on memory, the downloaded application to obtain behavioral data of the application; assigning, using the one or more processors, a risk score to the application based on the behavioral data of the application to determine whether the application is malicious before the application is downloaded by the first device; and implementing, using the one or more processors, a download decision for the first device based on the assigned risk score, wherein the download decision indicates at least whether the first device is able to download the application associated with the request.

In some embodiments, the source is a third-party website.

In some embodiments, the method further includes executing a hash algorithm to generate a hash of a package file associated with the application; comparing the generated hash to at least one stored hash; and determining whether the generated hash matches the at least one stored hash, wherein the downloaded application is executed at a secure environment associated with the second device upon determining the generated hash does not match the at least one stored hash.

In some embodiments, the connection data includes an internet protocol (IP) address associated with the source, a file name of the application, and domain name associated with the application.

In some embodiments, receiving the connection data includes installing an agent on the first device, enabling the agent to intercept traffic from the source, and communicating the connection data to the second device.

In some embodiments, implementing the download decision includes preventing the first device from downloading the application.

In some embodiments, implementing the download decision includes presenting the risk score to the first device, requesting confirmation from a user of the first device to download the application, receiving an input from a user of the first device providing confirmation to download the application, and enabling the first device to download the application upon receiving confirmation to download the application.

In some embodiments, the implemented download decision is based on the risk score exceeding a threshold.

In some embodiments, executing the downloaded application to obtain behavioral data of the application includes replicating the application, and executing the replicated application in a secure environment.

According to another aspect embodiments relate to a system for monitoring network activity. The system includes an interface for at least receiving connection data associated with a request from a first device to download an application from a source; a second device configured to download the application based on the request; and one or more processors executing instructions stored on memory to: execute the downloaded application to obtain behavioral data of the application, assign a risk score to the application based on the behavioral data of the application to determine whether the application is malicious before the application is downloaded to the first device, and implement a download decision for the first device based on the assigned risk score, wherein the download decision indicates at least whether the first device is able to download the application associated with the request.

In some embodiments, the source is a third-party website.

In some embodiments, the one or more processors are further configured to execute a hash algorithm to generate a hash of a package file associated with the application, compare the generated hash to at least one stored hash, and determine whether the generated hash matches the at least one stored hash, wherein the downloaded application is executed at a secure environment associated with the second device upon determining the generated hash does not match the at least one stored hash.

In some embodiments, the data includes an internet protocol (IP) address associated with the source, a file name of the application, and domain name associated with the application.

In some embodiments, the system receives the connection data by installing an agent on the first device, enabling the agent to intercept traffic from the source, and communicating the connection data to the second device.

In some embodiments, the one or more processors implement the download decision by preventing the first device from downloading the application.

In some embodiments, the one or more processors implement the download decision by presenting the risk score to the first device and enabling the first device to download the application.

In some embodiments, the implemented download decision is based on the risk score exceeding a threshold.

In some embodiments, the one or more processors execute the downloaded application by replicating the application and executing the replicated application in a secure environment.

According to yet another aspect, embodiments relate to a computer program product for monitoring network activity, the computer program product comprising computer executable code embodied in one or more non-transitory computer readable media that, when executing on one or more processors, performs the steps of receiving connection data associated with a request from a first device to download an application from a source; downloading the application to a second device based on the request; executing the downloaded application to obtain behavioral data of the application; assigning a risk score to the application based on the behavioral data of the application to determine whether the application is malicious before the application is downloaded to the first device; and implementing a download decision for the first device based on the assigned risk score, wherein the download decision indicates at least whether the first device is able to download the application associated with the request.

In some embodiments, the computer program product further comprises computer executable code that, when executing on one or more processors, performs the steps of presenting the risk score to the first device, requesting confirmation from a user of the first device to download the application, receiving an input from a user of the first device providing confirmation to download the application, and enabling the first device to download the application upon receiving confirmation to download the application.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed sub- stantially concurrent or the blocks may sometimes be executed in the reverse order, depending upon the function- ality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second thresh- old value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolu- tion of the relevant system.

Specific details are given in the description to provide a thorough understanding of example configurations (includ- ing implementations). However, configurations may be practiced without these specific details. For example, well- known circuits, processes, algorithms, structures, and tech- niques have been shown without unnecessary detail in order to avoid obscuring the configurations. This description pro- vides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the dis- closure. For example, the above elements may be compo- nents of a larger system, wherein other rules may take precedence over or otherwise modify the application of various implementations or techniques of the present dis- closure. Also, a number of steps may be undertaken before, during, or after the above elements are considered.

Having been provided with the description and illustration of the present application, one skilled in the art may envision variations, modifications, and alternate embodiments falling within the general inventive concept discussed in this appli- cation that do not depart from the scope of the following claims.

What is claimed is:

1. A method for monitoring network activity, the method comprising:

receiving, at an interface, connection data from an agent installed on a first device, wherein the connection data includes HyperText Transfer Protocol traffic data associated with a request from the first device to download an application from a source, and the agent is installed with a root certificate and root privileges that allows the agent to have visibility into and intercept the connection data, and further allows the agent to decrypt the connection data to:

extract a file name from the connection data, wherein the file name includes an application package file, and confirm the file is an application package file associated with the application requested by the first device by checking a string in a response payload from the source, wherein the package file executes instructions regarding how the application is to be installed;

communicating a request from a second device to the source based on the received connection data to down- load the application to the second device;

executing, using one or more processors executing instructions stored on memory, the downloaded appli- cation to obtain behavioral data of the application;

assigning, using the one or more processors, a risk score to the application based on the behavioral data of the application to determine whether the application is malicious before the application is downloaded by the first device; and implementing, using the one or more processors, a down- load decision for the first device based on the assigned risk score, wherein the download decision indicates at least whether the first device is able to download the application associated with the request.

2. The method of claim 1 wherein the source is a third- party website.

3. The method of claim 1 further comprising:

executing a hash algorithm to generate a hash of the package file associated with the application;

comparing the generated hash to at least one stored hash; and determining whether the generated hash matches the at least one stored hash, wherein the downloaded appli- cation is executed at a secure environment associated with the second device upon determining the generated hash does not match the at least one stored hash.

4. The method of claim 1 wherein the connection data includes an internet protocol (IP) address associated with the source, and domain name associated with the application.

5. The method of claim 1 wherein receiving the connec- tion data includes:

installing the agent on the first device, enabling the agent to intercept traffic from the source, and communicating the connection data to the second device.

6. The method of claim 1 wherein implementing the download decision includes preventing the first device from downloading the application.

7. The method of claim 1 wherein implementing the download decision includes:

presenting the risk score to the first device, requesting confirmation from a user of the first device to download the application, receiving an input from a user of the first device providing confirmation to download the application, and enabling the first device to download the application upon receiving confirmation to download the application.

8. The method of claim 1 wherein the implemented download decision is based on the risk score exceeding a threshold.

9. The method of claim 1 wherein executing the downloaded application to obtain behavioral data of the application includes:

replicating the application, and executing the replicated application in a secure environment.

10. A system for monitoring network activity, the system comprising:

an interface for at least receiving connection data from an agent installed on a first device, wherein the connection data includes HyperText Transfer Protocol traffic data associated with a request from the first device to download an application from a source, and the agent is installed with a root certificate and root privileges that allows the agent to have visibility into and intercept the connection data, and further allows the agent to decrypt the connection data to:

extract a file name from the connection data, wherein the file name includes an application package file, and confirm the file is an application package file associated with the application requested by the first device by checking a string in a response payload from the source, wherein the package file executes instructions regarding how the application is to be installed;

a second device configured to communicate a request to the source based on the received connection data to download the application from the source; and one or more processors executing instructions stored on memory to:

execute the downloaded application to obtain behavioral data of the application, assign a risk score to the application based on the behavioral data of the application to determine whether the application is malicious before the application is downloaded to the first device, and implement a download decision for the first device based on the assigned risk score, wherein the download decision indicates at least whether the first device is able to download the application associated with the request.

11. The system of claim 10 wherein the source is a third-party website.

12. The system of claim 10 wherein the one or more processors are further configured to:

execute a hash algorithm to generate a hash of the package file associated with the application, compare the generated hash to at least one stored hash, and determine whether the generated hash matches the at least one stored hash, wherein the downloaded application is executed at a secure environment associated with the second device upon determining the generated hash does not match the at least one stored hash.

13. The system of claim 10 wherein the connection data includes an internet protocol (IP) address associated with the source, and domain name associated with the application.

14. The system of claim 10 wherein the system receives the connection data by:

installing the agent on the first device, enabling the agent to intercept traffic from the source, and communicating the connection data to the second device.

15. The system of claim 10 wherein the one or more processors implement the download decision by preventing the first device from downloading the application.

16. The system of claim 10 wherein the one or more processors implement the download decision by:

presenting the risk score to the first device, and enabling the first device to download the application.

17. The system of claim 10 wherein the implemented download decision is based on the risk score exceeding a threshold.

18. The system of claim 10 wherein the one or more processors execute the downloaded application by:

replicating the application, and executing the replicated application in a secure environment.

19. A computer program product for monitoring network activity, the computer program product comprising computer executable code embodied in one or more non-transitory computer readable media that, when executing on one or more processors, performs the steps of:

receiving, at an interface, connection data from an agent installed on a first device, wherein the connection data includes HyperText Transfer Protocol traffic data associated with a request from the first device to download an application from a source, and the agent is installed with a root certificate and root privileges that allows the agent to have visibility into and intercept the connection data and further allows the agent to decrypt the connection data to;

extract a file name from the connection data, wherein the file name includes an application package file, confirm the file is an application package file associated with the application requested by the first device by checking a string in a response payload from the source, wherein the package file executes instructions regarding how the application is to be installed;

communicating a request from a second device to the source based on the received connection data to download the application to the second device based on the request;

executing the downloaded application to obtain behavioral data of the application;

assigning a risk score to the application based on the behavioral data of the application to determine whether the application is malicious before the application is downloaded to the first device; and implementing a download decision for the first device based on the assigned risk score, wherein the download decision indicates at least whether the first device is able to download the application associated with the request.

20. The computer program product of claim 19 wherein the computer program product further comprises computer executable code that, when executing on one or more processors, performs the steps of:

presenting the risk score to the first device, requesting confirmation from a user of the first device to download the application, receiving an input from a user of the first device providing confirmation to download the application, and enabling the first device to download the application upon receiving confirmation to download the application.

* * * * *